April 8, 1924.  
A. F. MASURY ET AL  
1,489,582
SPRING SUSPENSION FOR MOTOR VEHICLES
Filed April 4, 1922
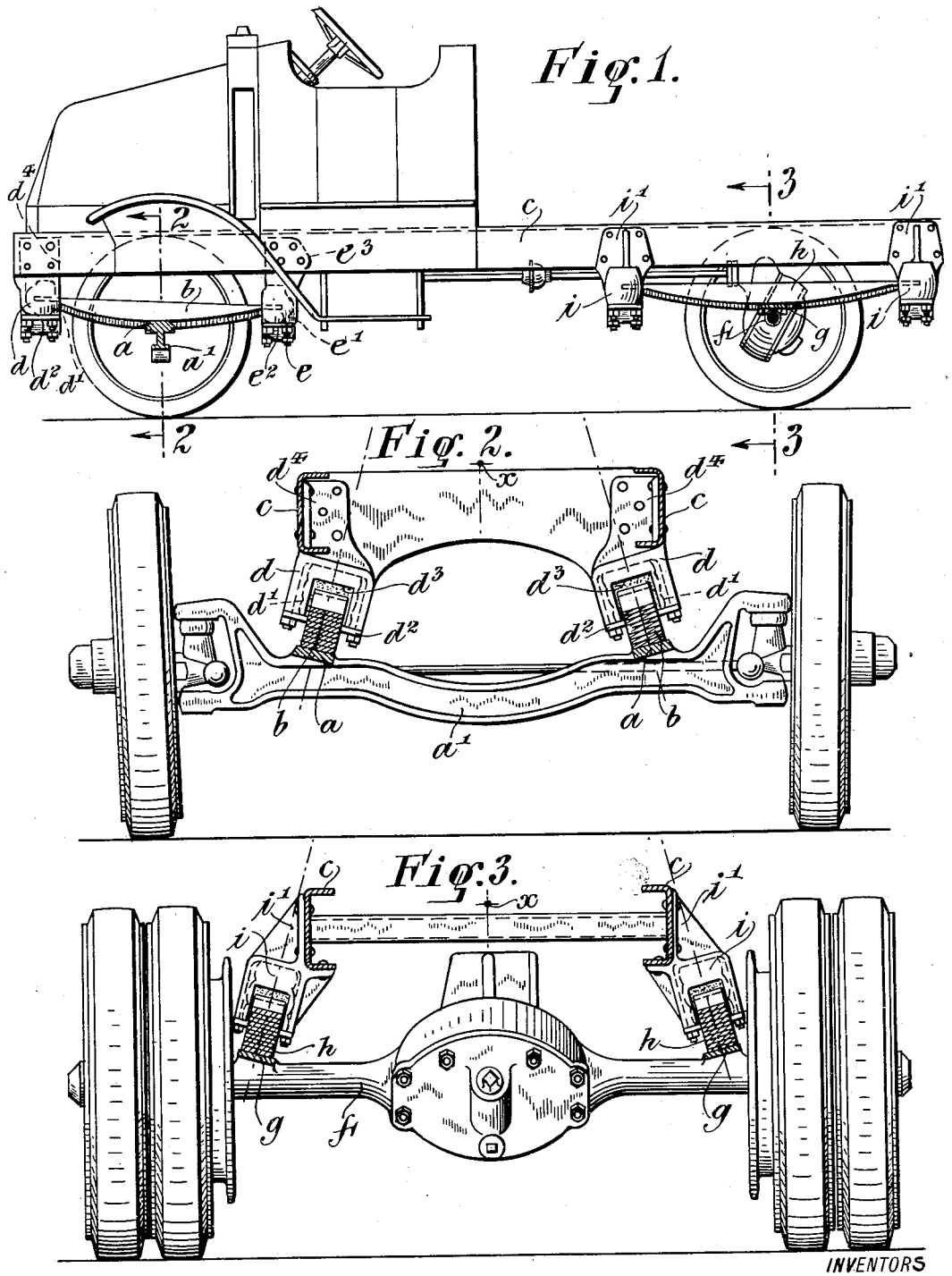
INVENTORS
*Alfred F. Masury*
*August H. Seifert*
BY
*Redding & Greeley*
ATTORNEYS Patented Apr. 8, 1924.                                                          1,489,582

UNITED STATES PATENT OFFICE.

ALFRED F. MASURY AND AUGUST H. LEIPERT, OF NEW YORK, N. Y., ASSIGNORS TO INTERNATIONAL MOTOR COMPANY, OF NEW YORK, N. Y., A CORPORATION OF DELAWARE.

SPRING SUSPENSION FOR MOTOR VEHICLES.

Application filed April 4, 1922. Serial No. 549,402.

*To all whom it may concern:*

Be it known that we, ALFRED F. MASURY and AUGUST H. LEIPERT, citizens of the United States, residing, respectively, in the borough of Manhattan and in the borough of Queens, of the city of New York, in the State of New York, have invented certain new and useful Improvements in Spring Suspensions for Motor Vehicles, of which the following is a specification, reference being had to the accompanying drawings, forming a part hereof.

This invention relates to a spring suspension for vehicles and particularly to motor vehicles wherein the speeds and loads are such as to cause relatively high stresses on the body of the vehicle tending to cause it to move with great momentum in both vertical and horizontal planes. It has been proposed heretofore to resist yieldingly the side sway of the body of a vehicle by providing springs which act on the body generally in a horizontal plane. In such constructions it has been usual to employ suitable springs to suspend the vehicle and absorb the vertical stresses imposed thereby in its vertical movements. It is the general object of the present invention to provide a spring suspension for the bodies of vehicles which shall be of standard construction and involve no change in the usual parts or any addition thereto but which shall serve to resist both the vertical movements of the body as well as the horizontal movements thereof. In accordance with the invention it is proposed to mount the body yieldingly on springs of conventional form, which springs shall be so disposed with respect to the body as to resist yieldingly the side sway thereof. In the specific adaptation of the invention, illustrated in the accompanying drawings, the suspension is shown for motor vehicles and has included leaf springs of conventional form whose ends are connected to the frame of the chassis through yielding blocks, such as rubber, confined within metal housings secured to the frame. In its broadest aspects the invention is not to be limited to this type of connection between the spring and the frame, although this type of connection lends itself readily to the improvements herein. In carrying out the invention it is proposed to tip the leaf springs inwardly on their seats so that the springs lie substantially in the plane of the resultant between the vertical and horizontal movements of the vehicle body. In these planes the springs will most effectively resist the resultant of all of the usual movements of the vehicle body. In addition, these springs serve not only as a yielding suspension for the body but also act somewhat like truss members giving greater stability to the entire suspension and reduce the objectionable movements of the body.

Reference is now to be had to the accompanying drawings for a somewhat conventional illustration of the adaptation of the invention to a motor vehicle, wherein:

Figure 1 is a view in side elevation of a conventional type of chassis of a motor truck in which the improved spring suspension is employed.

Figure 2 is a view taken along the plane indicated by the line 2—2 of Figure 1 and looking in the direction of the arrows to show the relation of the springs to the front axle.

Figure 3 is a similar view taken on the plane indicated by the line 3—3 of Figure 1 and looking in the direction of the arrows to show the relation of the springs to the rear axle.

It will be understood as the description proceeds that the claims appended hereto are not to be limited to the precise means for accomplishing the desirable results attained by the embodiment of the invention in a vehicle, since it will be understood by one skilled in the art that the desired relation of elements may be brought about by constructions which differ from those illustrated herein. However, it is an object of the invention to accomplish these desirable results without the addition of parts to the suspension of a motor vehicle and without substantial modification of such parts. In the simplest embodiment it is proposed to form the spring seats *a* on the front axle *a'* with a converging inclination so that these seats are tipped inwardly with respect to the center line of the load. Conventional vehicle springs, illustrated as leaf springs *b* are secured on the seats *a* in the usual manner and by means which form no part of the present invention and their ends are connected to the frame *c* of the chassis by any suitable connecting devices. In one of the simplest forms of the invention it is proposed to secure to the frame c housings d, e, into which the front and rear ends of the springs b at opposite sides of the frame, extend, respectively. The ends are connected to the vehicle through yielding blocks, which may be of rubber, indicated by dotted lines at d', and e' in Figure 1 and confined within the respective housings by removable caps such as $d^2$, $e^2$, respectively, all in a manner which appears at greater length in Letters Patent of the United States, No. 1,404,876 dated January 31, 1922. The housings d, e, have their proximate ends open, respectively, to receive the ends of the springs b. These openings in the housings d are indicated at $d^3$ in Figure 2. The bodies of the housings d, e, are cast generally to conform to the inclination of the springs b, their supporting brackets $d^4$, $e^3$, being similarly cast to conform to the side frame members c to facilitate their attachment thereto.

As shown in Figure 3 the rear axle tube may carry thereon spring seats g which are also inclined inwardly to receive vehicle springs h which are tipped inwardly towards the center line of the load. The ends of these springs are also shown as connected to the frame c through housings i which may have confined therein yielding blocks engaged with the ends of the springs in a manner which has been described above. The housings i are inclined to conform generally to the inclination of the springs h, while their supporting brackets i', which may be integral therewith, are cast for securing to the vertical frame members c. The invention is not to be limited, however, to the specific form of the housings or brackets.

By the spring suspension described, it will be understood that both vertical movements and horizontal movements of the frame c are resisted yieldingly by the vehicle springs H which themselves may be of conventional form. It has been thought best to mount these springs in about the resultant plane between the horizontal and vertical movements of the vehicle body. This result may be secured to a greater or less degree by tipping the springs inwardly towards the center line of the load. In this position they not only serve as suspension springs and resist side sway but become, in effect, yielding trusses which add to the stability of the suspension and reduce undesirable movements and vibrations to an appreciable extent.

In the drawings the point indicated at x may be considered about the position where the center of gravity of a vehicle will be found. The center lines through the inclined springs are dotted in in the drawings and it is evident that these converging lines will intersect at a point well above the center of gravity. This is the desired relation since if the pitch of the springs is too much it might cause a "tender vehicle."

As indicated hereinbefore details of construction may be changed and the relation of parts secured by means which it is within the skill of a mechanic to design.

What we claim is:

1. In vehicle construction in combination with axles and the vehicle frame, longitudinally extending leaf springs connected to the axle and to the frame and confined in a plane inclined inwardly from the vertical towards the longitudinal center line of the load.

2. In vehicle construction in combination with the axles and frame of the vehicle, longitudinally extending leaf springs confined in planes which are tipped inwardly from the vertical towards the longitudinal center line of the load and disposed about in the plane of the resultant between the horizontal and vertical movements of the frame.

3. In a motor vehicle in combination with the front and rear axles and frame, spring seats on the axles confined in planes inclined, respectively, from the vertical towards the longitudinal center line of the load, longitudinally extending leaf springs seated on the respective seats and means to connect the ends of the springs with the frame.

4. In a motor vehicle in combination with the front and rear axles and frame, spring seats on the axles inclined towards the longitudinal center line of the load, leaf springs of conventional form seated on the seats and confined, respectively, in planes coinciding substantially with the planes of the resultants between the vertical and horizontal movements of the frame, housings to receive the ends of the springs inclined to conform to their inclination, yielding connections confined within the housings and engaging the ends of the springs and means to secure the housings to the frame.

This specification signed this 15 day of March, A. D. 1922.

ALFRED F. MASURY.
AUGUST H. LEIPERT.